June 24, 1941.  C. E. HOOVER, JR  2,247,297
MACHINE FOR TESTING AND MATCHING COLORS
Filed Sept. 8, 1939   3 Sheets-Sheet 1
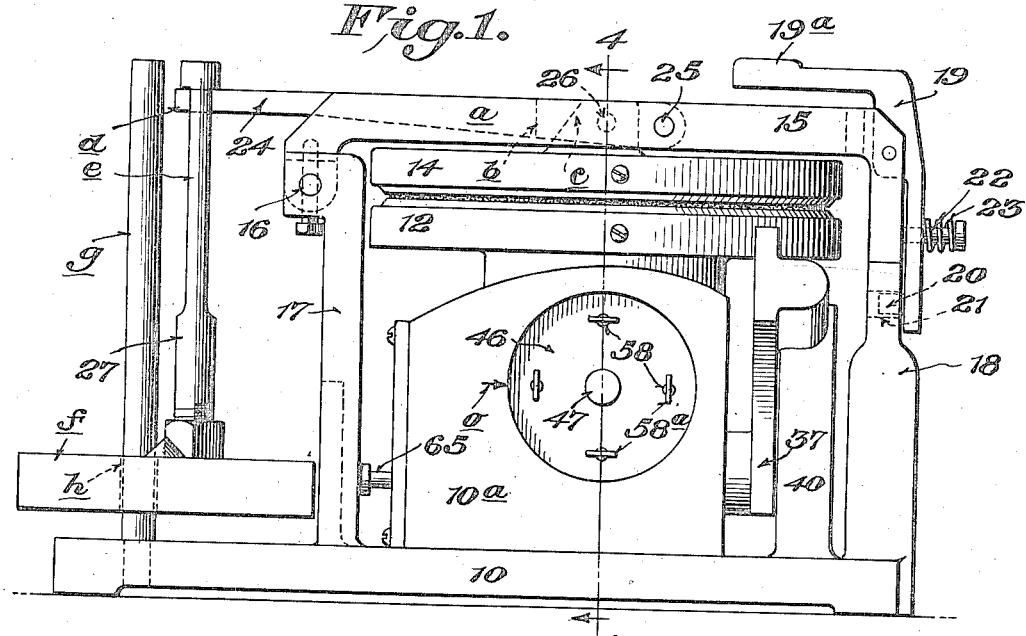
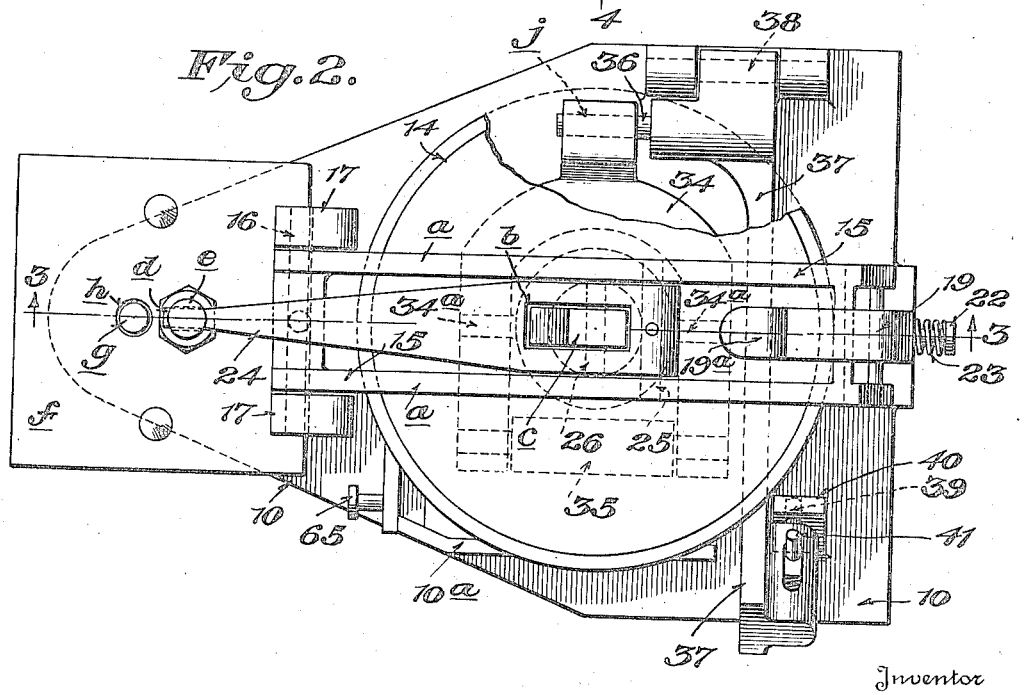
Inventor
Charles E. Hoover, Jr.,
Attorney

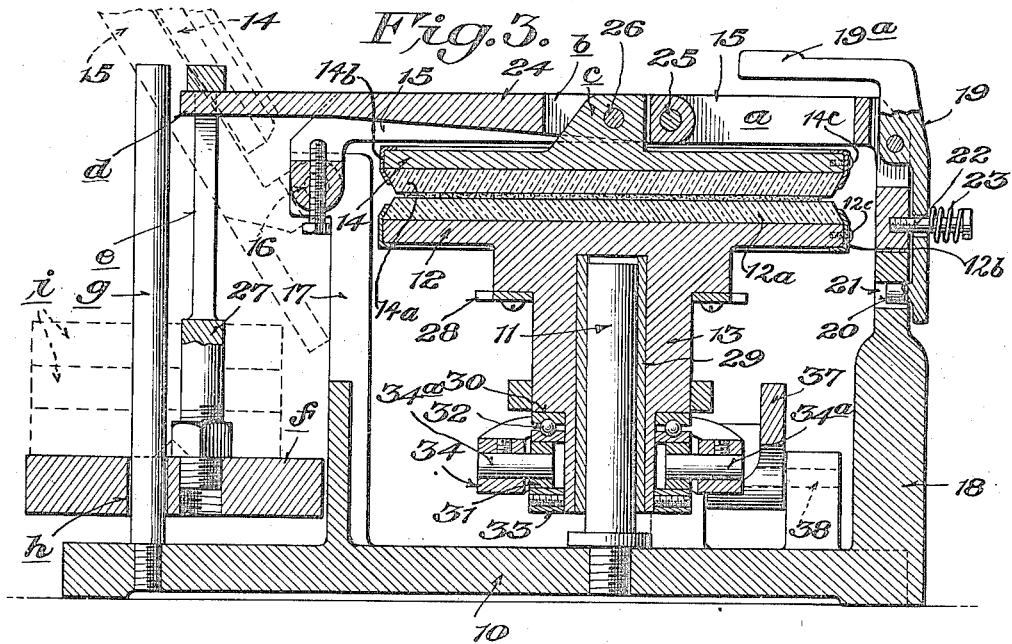
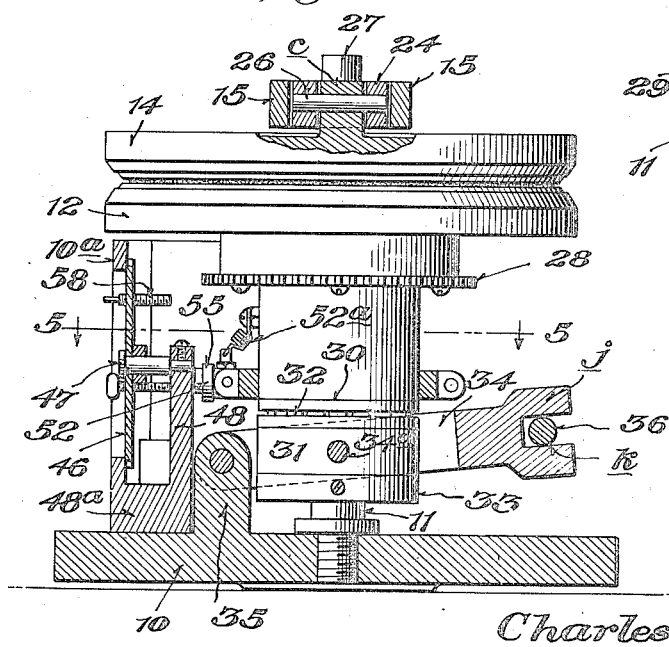
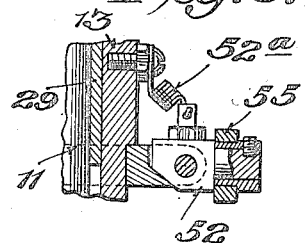

June 24, 1941.    C. E. HOOVER, JR    2,247,297
MACHINE FOR TESTING AND MATCHING COLORS
Filed Sept. 8, 1939    3 Sheets-Sheet 3
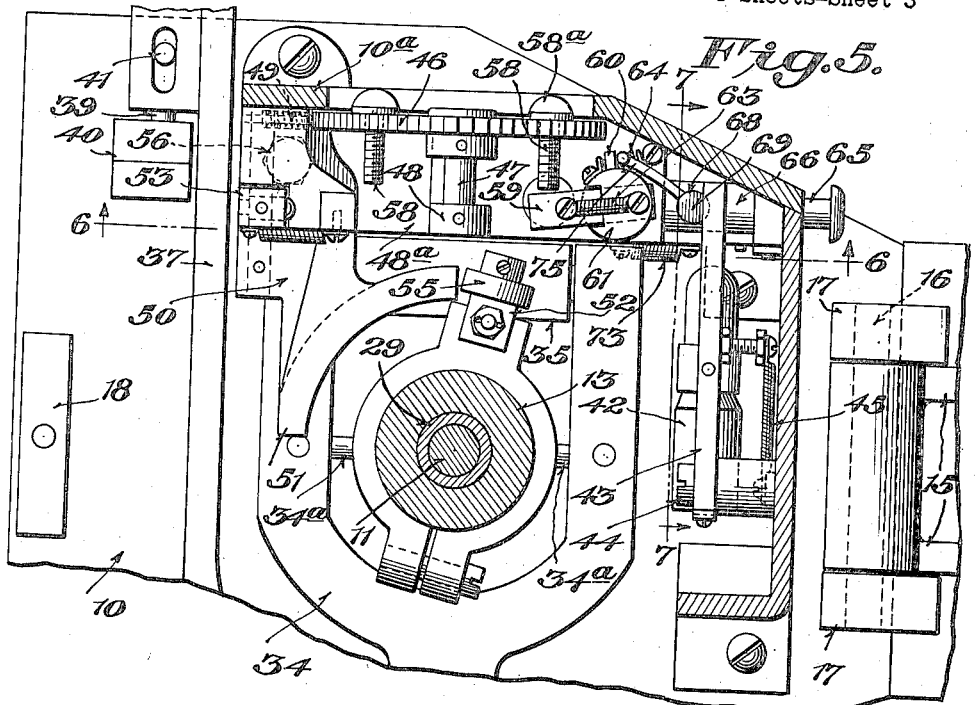
Fig. 5.
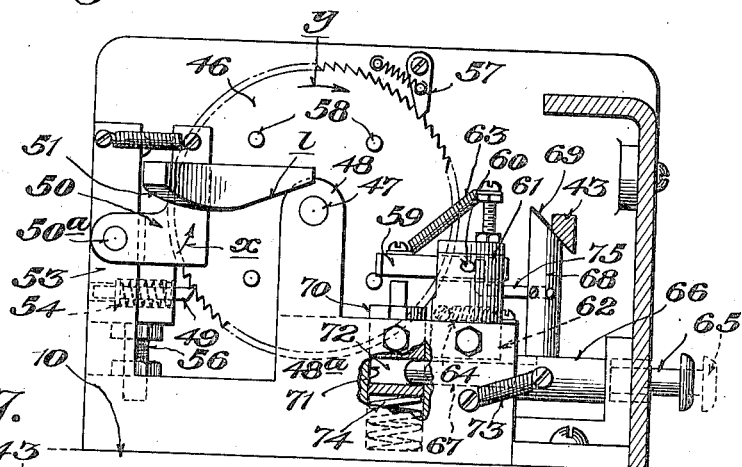
Fig. 6.
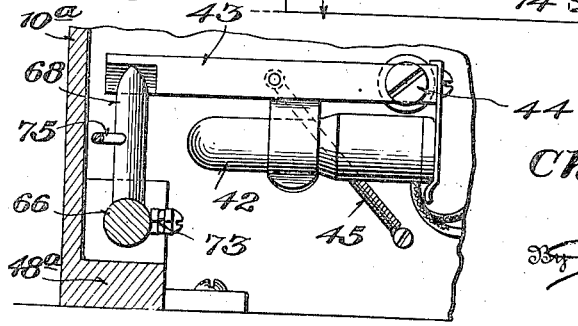
Fig. 7.
Inventor
Charles E. Hoover, Jr.
Attorney Patented June 24, 1941

2,247,297

UNITED STATES PATENT OFFICE 2,247,297

MACHINE FOR TESTING AND MATCHING COLORS

Charles E. Hoover, Jr., Maplewood, N. J.

Application September 8, 1939, Serial No. 294,029

8 Claims. (Cl. 73—51)

The present invention relates to machines for testing and matching colors and is an improvement upon the machine shown in U. S. Letters Patent No. 2,150,603.

The object of the present invention is to produce a machine for testing or matching colors and of a construction which is most efficient, durable, and economical in use and manufacture, said construction permitting the parts to be readily disassembled and assembled for purposes of cleaning and repair.

A feature of the present invention resides in two mulling plates arranged one over the other and having a relative mulling movement, one plate being carried by a swinging frame so that it may be moved to operative and inoperative positions to cover and expose the other plate, and said other plate being movable to and from operative position.

Another feature of the invention is the provision of two mulling members arranged one over the other and having a relative mulling movement, the lower member being mounted so that it may be moved up and down relatively to the upper member and, when moved upwardly, is brought into operative relation therewith and, when moved downwardly, will break the adhesion between the two members after a mulling operation.

A still further feature of the invention resides in the novel selective means for timing the mulling operation and by which said operation may be controlled.

Further objects and features of the invention reside in the novel and sundry details of construction, combination and arrangement of parts hereinafter more fully described and pointed out in the appended claims.

In the drawings, which show the preferred embodiment of the invention as at present devised—

Fig. 1 is an elevation of the machine looking toward what may be termed the front or face of the machine;

Fig. 2 is a top plan view of the machine as shown in Fig. 1;

Fig. 3 is a vertical sectional view taken substantially on line 3—3 of Fig. 2;

Fig. 4 is a transverse vertical view taken substantially on line 4—4 of Fig. 1;

Fig. 5 is a horizontal sectional view taken on line 5—5, Fig. 4, showing the control mechanism.

Fig. 6 is a vertical sectional view taken substantially on line 6—6 of Fig. 5;

Fig. 7 is a vertical sectional view taken substantially on line 7—7 of Fig. 5; and Fig. 8 is a fragmentary detailed view of a stud for actuating the counting device of the controlling mechanism.

Referring more in detail to the drawings in which like parts are indicated by the same reference numerals, 10 denotes a substantially flat base by which the apparatus is supported. A cylindrical post or spindle 11 extends vertically and upwardly from said base, at a suitable point in its area, to form a bearing support for the bottom mulling plate 12, this plate having a centrally disposed downwardly extending boss or hub 13, suitably bored to receive the post 11. A mulling plate 14 is disposed above and arranged to overlie the mulling plate 12 so that the two will cooperate in the mulling operation. This plate 14 is carried by a frame 15 which extends horizontally across the top of the machine and has one end pivoted, as at 16, to upstanding bracket arms 17 rigid with the base 10. Thus, it will be seen that the frame 15 may be swung in a vertical plane about its pivot 16 from its position shown in the drawings to the dotted line position shown in Figure 3 to fully expose the lower mulling plate 12.

The distal end of the frame 15 normally rests upon the upper end of a standard or bracket 18, which rises from the base 10, when the frame 15 is in the position shown by full lines in the drawing to support the mulling plate 14 in cooperative relation to the mulling plate 12. The frame 15 is locked in this normal position by a latch consisting of a pivoted lever 19 carried by the frame 15 and having a lateral projecting detent end 20 to engage in an opening 21 in the upright 18. A stud bolt 22 carried by the frame 15 passes through an opening in the lever 19 and a helical spring 23 between the head of the bolt 22 and the lever normally urges and maintains the detent in the opening 21. The other end of the lever 19 is provided with a finger piece 19a, which overlies the frame 15 to be conveniently depressed to move the detent 20 out of the opening 21.

In a mulling machine of this type it is desirable and necessary that the pressure on the material being treated between the plates 12 and 14, be variable according to the requirement for obtaining the proper attrition. In the present device, this is provided for by mounting the top plate 14 in a loose or floating manner on the frame 15, as for example, through the medium of an arm 24 pivotally connected at one end portion 25 to the frame 15 and at an intermediate point 26 to the plate 14, and by having the other or distal end of the arm 24 influenced by a variable pressure means, such as, for example, a weight-hanger 27 which itself is removable from the arm 24 or may have other weights applied thereto.

More specifically, the frame 15 comprises two parallel bars $a$ (see Fig. 2) connected at their end portions and between which the pivoted end of the arm 24 is disposed. The pivot pin 25 extends through said end of the arm 24 and is connected at its end portion to the bars $a$. The arm 24 is provided with a recess $b$ at a point along its length between its end and into which a projection $c$ on the mulling plate 14 extends, the pivot pin 26 extending through said projection $c$ and having its ends mounted in the arm 24. Thus, the distance of the arm 24 between the pivot pins 25 and 26 provides a loose or pivoted connecting link between the upper mulling plate 14 and the frame 15.

The distal end $d$ of the arm 24 extends beyond the frame 15 to removably extend into an elongated slot $e$ in the stem of the weight-hanger 27. The hanger 27 is provided on the lower end with a weight-supporting flange $f$ through which a guide rod $g$, removably secured to the base 10, extends through an opening $h$ in the flange $f$. The dotted lines show additional weights $i$ which may be employed for varying the pressure between the plates 12 and 14, said weights being provided with a suitable slot which will straddle the hanger stem 27 and the guide rod $g$.

As the mulling operation is accomplished by subjecting the material to be treated to attrition between the mulling plates, the lower mulling plate 12 is rotated about its axis or supporting post 11 by any suitable means, such, for instance, as a sprocket 28 concentrically arranged about the hub 13 and about which a suitable chain may be passed, connected with a suitable variable speed device of any approved type, which, of course, is driven from a source of power. However, it is to be understood that any other suitable means may be employed for rotating the mulling plate 12.

A suitable liner or bearing 29 is arranged between the walls of the bore of the hub 13 and the spindle 11, upon which the hub does not only rotate but also reciprocates longitudinally thereof. This reciprocating movement of the hub 13 on the spindle 11 is to initially break, after each mulling operation, the adhering contact between the mulling surfaces of the plates 12 and 14 due to the material being therebetween. To this end the lower end of the hub 13 is reduced concentrically with the spindle 11 to provide a bearing shoulder 30. Within this reduced portion of the hub there is disposed a collar 31. Interposed between the collar 31 and the shoulder 30 is an anti-frictional bearing 32; and on the other side of the collar 31 is disposed a lock flange 33 for holding the collar in position on said reduced portion of the hub. A yoke 34 straddles the collar 31 circumferentially and has its free ends pivotally secured to bearing post 35 on the base plate 10. The closed end of the yoke 34 is forked to provide upper and lower bearing surfaces $j$ and $k$, between which lies a horizontally extending pin 36 laterally projecting from a vertically swinging lever 37 mounted on a horizontal axis 38 fixed to the base 10. The yoke 34 carries oppositely arranged inwardly extending studs 34a journalled in the collar 31.

The lever 37 extends from the rear of the supporting plate 10 to the forward or front side of the machine as shown in Figs. 1 and 2 and, when in the full line position shown in the drawings, moves the plate 12 upwardly to the limit of its movement, at which point a spring pressed detent 39 engages in an opening in a post 40 on the base 10 so as to maintain the mulling plate 12 in cooperative relation with the plate 14. When the detent 39 is released from the opening in post 40 by the finger piece 41, downward pressure on the distal end of the lever 37 will break the adhesive contact between the plates 12 and 13. The adhesion between the plates after each operation is rather substantial and the leverage provided through the lever 37, pin 36, fork 34 on the collar 31 is sufficient to break this contact and allow the frame 15 to be swung to inoperative position so that the plate 14 will uncover the plate 12.

The amount of mulling or rubbing operation produced by the relative movement of the plates 12 and 14 can be regulated and controlled by a timing device for stopping the motor or for operating a clutch mechanism, not shown. In the present embodiment this timing mechanism operates a switch 42, which is preferably a mercury switch, carried on a vertically tiltable arm 43 pivoted at one end, as at 44, and biased to be urged to normal position by a spring 45. The timing device may be, as shown in the drawings, a counting device registering the number of revolutions or complete relative movements of the mulling plates and comprising a disc or wheel 46 having a spindle 47 disposed at its central axis and journalled in the bearing 48. This wheel 46 is provided with ratchet teeth (preferably equi-spaced) about its periphery which are engaged by a pawl 49 carried on a pivoted trigger 50 having a projection 51 extending into the path of movement of a trip 52 fast on the hub 13 of the rotary mulling plate 12. The trigger 50 is pivoted to a post 53 rising from the base 10 at a point near the wheel 46 which latter is disposed at the front side of the machine. The trigger may take any suitable form to swing on a horizontal axis 50a so as to move the pawl 49 upwardly or in the direction or rotation of the wheel 46, when the trigger is actuated by the trip 52, yieldably mounted, as at 52a, to absorb violent shocks. The pawl 49 is preferably slidably mounted in a recessed portion of the trip 50 adjacent the periphery of the wheel 46 and is normally urged outwardly by a spring 54 to maintain normal contact with the periphery of the wheel 46.

The trigger projection 51 is preferably arcuate and substantially concentric with the hub 13 and has a convexed under side or surface 1 which engages and rides upon a roller 55 on the trip 52. Consequently, upon each revolution of the hub 13 the trip 52 will engage the surface 1 of the trigger extension 51 and, because of the convex shape of this surface, will raise the trigger in the direction of the arrow $x$ about its pivot 50a carrying with it a dog 49 and advancing the wheel 46 one notch or tooth in the direction of the arrow $y$ (see Fig. 6). After the trip 52 has passed from under the projection 51 the trigger 50 drops down to its original position to be again actuated upon the next revolution of the hub 13.

The normal position of the trigger 50 may be varied by adjustment of the stop bolt 56, whereby the throw of the trigger 50 and the resultant rotation of the wheel 46 may be increased or decreased according to the adjustment of this stop 56. A reverse or backward movement of the wheel 46 is prevented by a spring pressed dog 57. The wheel 46 is provided with means for selectively varying the time at which the switch 42 will be operated to open the circuit to an actuating motor or controlling instrumentality, such as a clutch, from which the mulling plate 12 is actuated. This selective or variable timing means may comprise adjustable keys or projections 58 spaced around the axis of the wheel or disc 46, so that, for any given operation, when the disc 46 has been properly set with respect to a zero point o (Fig. 1) and one of the projections 58 has been adjusted to operative position it will trip a suitable mechanism for actuating the switch arm 43.

As shown in the drawings, particularly Figs. 1, 5, and 6, the projections 58 are shown as being four in number equally spaced about the disc 46 and are in the form of studs threaded through the disc 46 and provided with finger pieces 58a on the front side of the disc so as to be readily accessible to the operator. Thus, when it is desired to have the muller rotate for the full rotation of the disc 46, the screws 58 are withdrawn except one opposite the zero indication mark on the front plate 10a of the timer. This screw will be screwed its full length inwardly so as to be in the path of a switch trip 59 (see Figs. 5 and 6). When the switch arm 43 is to be operated at one-half of the rotation of the disc 46, all of the projections 58 are withdrawn from the path of the switch trip 59 except the one diametrically opposite the zero point o. If the switch arm 43 is to be operated at one-quarter turn of the disc 46, then all of the projections 58 may be projected into the path of the switch trip 59 and one arranged opposite the zero mark o. Of course, there may be as many projections 58 as desired and their construction or design may be varied from that shown.

The switch trip 59 is in the form of a lug pivoted on a horizontal axis 60, to a spindle 61 rotatable about a vertical axis. The spindle 61 is mounted in a cylindrical bore 62 (Fig. 6) in the block 48a so as to be oscillated. The block 48a also carries the bearings 48 for the shaft 47 of the disc 46. The switch trip 59 is biased to a normal horizontal position by a tension spring 63 and the spindle 61 is biased by spring 64 to move it to a position so that the switch trip 59 will lie in the path of movement of any extended projection 58 on the disc 46. This switch trip 59 is in the nature of a safety device interposed between the projections 58 on the counter or timing disc 46 and a latch means 70 for the purpose of transmitting motion to the latch means 70 (hereinafter more fully described) to release the same only when the starting element or handle 65 for controlling the operation of the machine is in its starting or machine operating position shown in dotted lines of Fig. 6 and as will more fully hereinafter appear.

The starting handle 65 is on the outer end of a rod 66 slidably mounted in a bore 67 in the block 48a. Projecting laterally from that portion of the rod 66 projecting from the bore 67 is a finger 68 having the surface of its free end bevelled, as at 69, and upon which rides a complemental bevelled surface on the lower side of the switch arm 43. It will thus be seen that when the handle 65 is drawn outwardly to the dotted line position shown in Fig. 6 the switch arm 43 will ride upon the surface 69, thus raising and tilting said arm which carries the mercury switch 42 closing the circuit to cause mulling plate 12 to rotate. At the same time this operation takes place the spring 64 rotates the spindle 61 to move a switch trip 59 in the path of movement of the projections 58.

The starter handle 65 is maintained in its starting position, shown in dotted lines in Fig. 6, by a latch positioned under the switch trip 59 and actuated thereby. This latch, in the present embodiment, takes the form of an upwardly spring pressed plunger 70 mounted in a suitable bore 71 in the block 48a, which bore communicates with the bore 67 in which the handle rod 66 is slidably mounted.

The plunger 70 has a passage 72 therein which is designed to align with passage or bore 67 when the plunger is depressed by the trip switch 59 thus permitting the forward end of the rod 66 to enter therein and complete its movement (shown in full lines) to allow the switch trip 43 to ride downwardly on the surface 69 to break the electrical contact or circuit to the operating mechanism. A spring 73 connected to the rod 66 and the block 48a normally urges the rod 66 to its switch opening position. When the rod is withdrawn to its dotted line position as shown in Fig. 6 and removed from the passage 72, the spring 74 moves the plunger 70 upwardly thus disaligning the passages 67 and 72 whereby the handle 65 of the operating rod is maintained in starting or circuit closing position until a projection 58 strikes switch trip 59, depressing the same and consequently moving the plunger 70 to a point where the passages 67 and 72 realign and the spring 73 moves the forward end of the rod 66 in the passage 72. Simultaneously with the last stated operation, an arm 75 projecting from the finger 68 engages a projected end of the pivot 60, moving the spindle 61 in an anti-clockwise direction, thus moving the trip switch 59 out of the path of the projections 58.

The mulling members 12 and 14 may have their opposing faces of such character as will perform the mulling operation desired or may have superposed thereon plates 12a and 14a which are attached thereto and of such character as will perform the operation desired. As an example, such plates may be of glass, metal, fiber, porcelain, wood or fabric or any other desired material. The opposing surfaces of the mulling members 12 and 14 or the opposing surfaces of the plates 12a and 14a, when their opposing surfaces provide the mulling surfaces, are continuous or unbroken within the area of their perimeter. In the present instances these plates 12a and 14a provide the actual mulling surfaces and are shown as consisting of glass. These plates 12a and 14a are of a size commensurate with the size of the mulling members 12 and 14 and are rigidly and removably held in place by rings 12b and 14b respectively which fit the perimeters of the members 12 and 14 and have an inwardly extending flange which will grip the edges of the plates 12a and 14a. These rings are movably held in place by screws 12c and 14c which pass therethrough and threadedly engage in the mulling members 12 and 14.

It will thus be seen that in the use of the device, by pressing the latch handle 18a, the plate 14 may be removed from the plate 12 by swinging the frame 15 on its pivot 16; the operator may then mix a quantity of dry color and suitable vehicle to form a paste on the plate 12. Then move frame 15 to bring the plate 14 into the position shown in Figs. 1, 2, and 3 allowing the detent 20 to become fastened in the openings 21. Then move lever 37 upwardly to the position shown in Figs. 1 and 2 where the detent 39 will engage the opening in the lug 40, thereby raising the plate 12 upwardly and latching the same in cooperative position with the plate 14. The proper weights are placed upon the weight hanger 27 according to the pressure desired. The finger pieces 58a of the timing keys 58 are then suitably actuated to select the number of revolutions for the mulling operation and the disc 46 adjusted with respect to the zero mark 0 on the face plate 16a, as above described. The starter handle 65 is then pulled outwardly, to dotted line position of Fig. 6, actuating the switch arm 43 to cause the mulling plate 12 to rotate and the passages 67 and 72 to disalign so that the spring 74 will move the plunger 70 to hold the rod 66 in machine operating position. When the proper number of revolutions of the plate 12 has been made, one of the timing keys 58 will engage the switch trip 59, depressing the plunger 70 to a point where passages 67 and 72 align, thus permitting spring 73 to retract the starter handles 65 to machine stopping position to operate the switch arm 43 in the opposite direction to break the circuit or otherwise to stop the machine. The latch 39 is then operated to release the lever 37, which is then moved downwardly to break the adhesion between the mulling surfaces of the plates 12 and 14. Upon releasing the latch 19 and again swinging the frame 15 upwardly to expose the mulling surfaces of the mulling members 12 and 14 to view and access (as indicated in dotted lines of Fig. 3), the results of the operation may be ascertained.

Having thus described the invention and the manner in which the same is performed, it is to be understood that the invention is not to be limited to the exact features of construction herein shown and described because they are susceptible of being modified or varied in a manner which falls within the terms or scope of the appended claims.

That which is claimed is:

1. A mulling device for testing or matching samples of pigment for color or shades of color, comprising a frame, a pair of superposed mulling members arranged in cooperative relation and having opposed flat smooth mulling surfaces, each surface being continuous or unbroken within its perimeter, one of said members being mounted on said frame to have a rotary motion and to have a reciprocating motion to and from the other mulling member, means for rotating said rotatably mounted member, and means for reciprocating said rotatably mounted member for permitting the raising and lowering of said last mentioned member into and out of cooperative mulling relation with said other member, means movably mounting said other mulling member on said frame whereby the mulling surfaces of said members may be exposed or moved into relative cooperative mulling positions, means for yieldably mounting said other mulling member.

2. A mulling device for testing or matching samples of pigment for color or shades of color, comprising a frame, a pair of superposed mulling members arranged in cooperative relation and having opposed flat and smooth mulling surfaces continuous or unbroken within their perimeters, the lower of said members being mounted on said frame to have a rotary motion and to have a reciprocating motion to and from the upper mulling member, means for rotating said lower member, means for reciprocating said lower member for permitting the raising and lowering of said last mentioned member into and out of cooperative mulling relation with the upper mulling member, said upper mulling member being supported by said frame, means for yieldably mounting said upper mulling member, and means for exerting variable pressure on said upper mulling member.

3. A mulling device for testing or matching samples of pigment for color or shades of color, comprising a frame, a pair of superposed mulling members arranged in cooperative relation, the lower of said members being mounted on said frame to have a rotary motion and to have a reciprocating motion to and from the upper mulling member, means for rotating said lower member, means for reciprocating said lower member to move it into and out of mulling position with the upper member, said upper mulling member being supported by said frame, means for yieldably mounting said upper mulling member, and means for controlling the number of revolutions of said lower mulling member and including selectively adjustable means operated by said rotating mulling member for actuating said control means to stop said rotation when a preselected number of mulling movements have been reached.

4. In a color testing mulling machine of the kind described, a supporting frame including a base, a pair of substantially horizontally disposed mulling members having opposed mulling surfaces, means for rotatably journalling the lower mulling member on said base, means for reciprocating said lower mulling member vertically to move it into and out of cooperative mulling relation with the upper mulling member and including a manually operable element, the upper mulling member being disposed above said lower mulling member and mounted on a frame element movably supported by said supporting frame, and releasable means for rendering said movable frame element rigid with the supporting frame to maintain said mulling member in operative position and for permitting the frame element to be moved to exposed and render accessible the mulling surfaces.

5. A mulling device for testing or matching samples of pigment for color or shades of color as set forth in claim 4 wherein the upper mulling member is yieldably connected to said frame element and wherein means are provided for exerting a variable pressure on said upper mulling element.

6. A mulling device for testing or matching samples of pigment for color or shades of color as set forth in claim 4 wherein a weight arm is pivoted at one end portion to said frame element and its other end portion is provided with a variable weight means, and wherein the upper mulling member is connected to said arm.

7. In a mulling device for matching colors, comprising a supporting frame having a base, a pair of superposed mulling members, the lower of said members having a hub portion provided with a bore, a vertical spindle on said base and extending into said bore of the hub, whereby said lower mulling member may rotate and reciprocate on said spindle, means for rotating said hub on the spindle, a yoke straddling said hub and pivotally mounted at one of its ends to said frame, a connection between said yoke and said hub for reciprocating the hub on the spindle, a manually operated pivoted lever and an operative connection between said lever and the distal end of said yoke whereby said lower mulling member may be raised and lowered with respect to the upper mulling member.

8. In a mulling device for matching colors as set forth in claim 7 further characterized by means for releasably locking said lever in position to retain said lower mulling member in raised position.

CHARLES E. HOOVER, Jr.